(12) United States Patent
Tokiwa

(10) Patent No.: US 10,232,534 B2
(45) Date of Patent: Mar. 19, 2019

(54) METHOD FOR PRODUCING SKIN-COVERED POLYOLEFIN RESIN FOAMED MOLDED ARTICLE

(71) Applicant: JSP CORPORATION, Tokyo (JP)

(72) Inventor: Tomoo Tokiwa, Kanuma (JP)

(73) Assignee: JSP CORPORATION, Tokyo (JP)

( * ) Notice: Subject to any disclaimer, the term of this patent is extended or adjusted under 35 U.S.C. 154(b) by 1009 days.

(21) Appl. No.: 14/322,257

(22) Filed: Jul. 2, 2014

(65) Prior Publication Data

US 2015/0008607 A1    Jan. 8, 2015

(30) Foreign Application Priority Data

Jul. 8, 2013    (JP) ................. 2013-142707

(51) Int. Cl.
*B29C 44/20* (2006.01)
*B29C 44/08* (2006.01)
*B29C 44/18* (2006.01)
*B29C 49/00* (2006.01)
*B29K 23/00* (2006.01)
(Continued)

(52) U.S. Cl.
CPC .............. *B29C 44/08* (2013.01); *B29C 44/18* (2013.01); *B29C 49/0005* (2013.01); *B29C 44/3426* (2013.01); *B29C 44/3461* (2013.01); *B29C 49/04* (2013.01); *B29C 49/22* (2013.01); *B29C 49/46* (2013.01); *B29C 2049/4691* (2013.01); *B29K 2023/12* (2013.01); *B29K 2105/048* (2013.01); *B29K 2995/0063* (2013.01); *B29L 2031/3005* (2013.01)

(58) Field of Classification Search
CPC ................... B29C 44/08; B29C 44/20
See application file for complete search history.

(56) References Cited

U.S. PATENT DOCUMENTS 4,247,650 A * 1/1981 Shimizu ............... B29C 67/20
                                                          264/51
5,474,841 A * 12/1995 Matsuki ................ B29C 44/12
                                                          428/304.4
(Continued)

FOREIGN PATENT DOCUMENTS

EP    1 508 589 A1    2/2005
EP        1707592 A2 * 10/2006 ............... C08J 9/18
(Continued)

OTHER PUBLICATIONS https://plastics.ulprospector.com/datasheet/e94582/wintec-wfx6.*
Mar. 31, 2015 Search Report issued in European Application No. 14 17 5536.3.

*Primary Examiner* — Robert C Dye
*Assistant Examiner* — Nicholas R Krasnow
(74) *Attorney, Agent, or Firm* — Oliff PLC

(57) ABSTRACT

A method for producing a skin-covered polyolefin-based resin foamed molded article, including blow-molding a polyolefin parison into a skin defining a hollow space; and placing multi-layered polyolefin expanded beads in the hollow space; and heating the expanded beads placed in the hollow space to fuse-bond the expanded beads together and to fuse-bond the expanded beads to the skin, wherein the expanded beads have specific apparent density, specific average diameter, specific endothermic peaks in their DSC curve and specific melting point characteristics.

7 Claims, 1 Drawing Sheet

(51) Int. Cl.
*B29L 31/30* (2006.01)
*B29C 49/04* (2006.01)
*B29C 44/34* (2006.01)
*B29K 105/04* (2006.01)
*B29C 49/22* (2006.01)
*B29C 49/46* (2006.01)

(56) References Cited

U.S. PATENT DOCUMENTS

| | | | |
|---|---|---|---|
| 9,449,735 B2 * | 9/2016 | Chiba | H01B 1/24 |
| 2004/0256757 A1 | 12/2004 | Sasaki et al. | |
| 2005/0266244 A1 * | 12/2005 | Park | B29C 44/3461 |
| | | | 428/403 |
| 2009/0169895 A1 * | 7/2009 | Nohara | C08J 9/0061 |
| | | | 428/407 |
| 2013/0277299 A1 * | 10/2013 | Stouffer | B01D 39/2062 |
| | | | 210/435 |

FOREIGN PATENT DOCUMENTS

| | | |
|---|---|---|
| EP | 1 987 934 A2 | 11/2008 |
| EP | 2 420 533 A1 | 2/2012 |
| JP | A-06-166112 | 6/1994 |
| JP | B2-2860007 | 2/1999 |
| JP | 2004-068016 A | 3/2004 |
| JP | A-2004-249558 | 9/2004 |
| JP | 2012-184303 A | 9/2012 |

* cited by examiner

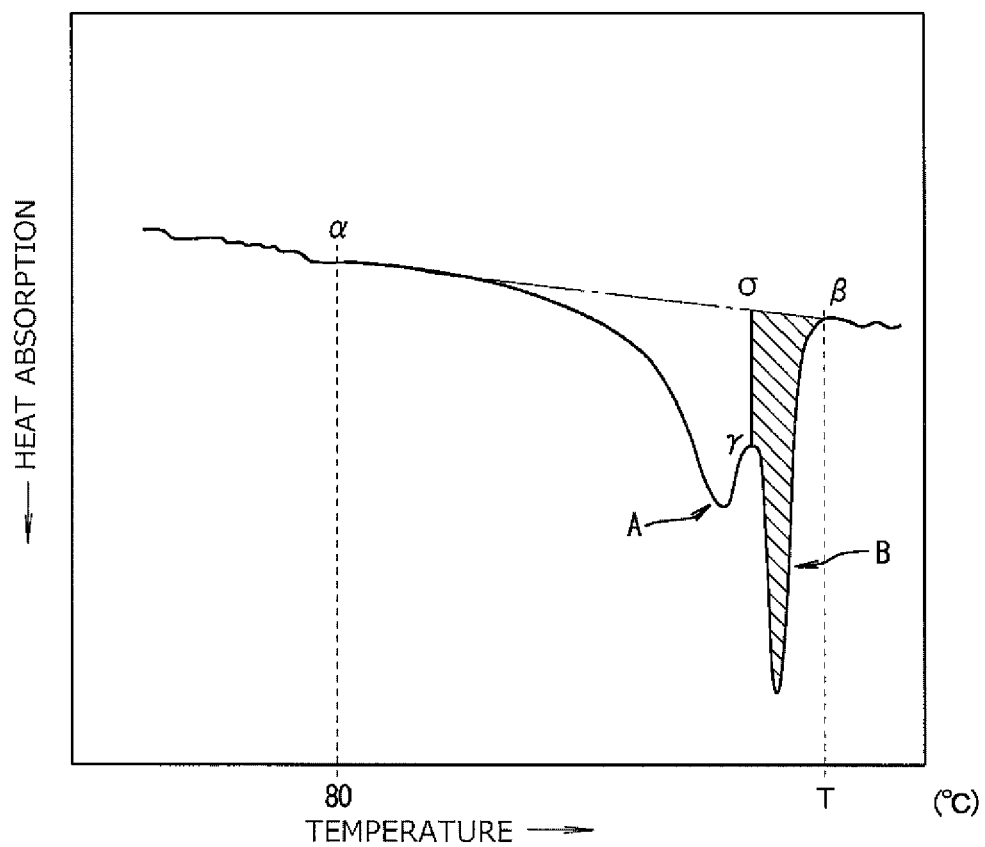

METHOD FOR PRODUCING SKIN-COVERED POLYOLEFIN RESIN FOAMED MOLDED ARTICLE

BACKGROUND OF THE INVENTION

Field of the Invention

The present invention relates to a method for producing a skin-covered polyolefin-based resin foamed molded article that is used as, for example, an automobile interior material. More specifically, the present invention relates to a method for producing a skin-covered polyolefin-based resin foamed molded article including the steps of forming a hollow, polyolefin-based resin molded body (namely a skin defining a hollow interior space) by blow molding, filling polyolefin-based resin expanded beads in the hollow interior space, and supplying a heating medium into the hollow interior space to fuse-bond the expanded beads to each other and to form a foamed molded article of the expanded beads (namely a foam layer) fuse-bonded to and covered with the skin.

Description of Prior Art

A skin-covered polyolefin-based resin foamed molded article obtained by filling expanded beads in a hollow interior space defined by a skin and introducing a heating medium into the hollow interior space to fuse-bond the expanded beads to each other and to the skin, and a method for the production thereof are heretofore known. Specifically, as a method for producing the skin-covered polyolefin-based resin foamed molded article, there is a method as described below.

Namely, a parison in a softened state extruded from an extruder is placed in a mold for blow molding. Then, pressurized air is blown into the parison to blow-mold the parison into a skin defining a hollow interior space. Then, expanded beads are filled in the hollow interior space, and a heating medium is introduced into the hollow interior space to heat the expanded beads and to cause the expanded beads to fuse-bond to each other. After cooling, the product is taken out of the mold to obtain a skin-covered polyolefin-based resin foamed molded article.

For example, Japanese Patent No. JP-B-2860007 derived from JP-A-H06 (1994)-166112 discloses a method for producing a skin-covered polyolefin-based resin foamed molded article including the steps of blow molding a skin defining therein a hollow interior space, filling expanded beads in the hollow interior space before the skin cools and hardens, and heating the expanded beads with a heating medium to fuse-bond the expanded beads to each other. Specifically, in order to fill the expanded beads in the hollow interior space efficiently, a hole is formed through the skin so that the hollow interior space can be open to the atmosphere when the expanded beads are filled in the hollow interior space.

Japanese Patent Publication No. JP-A-2004-249558 discloses a skin-covered foamed molded article produced using expanded beads and a method for producing the foamed molded article. The expanded beads each have an expanded core layer formed of a resin and a non-expanded cover layer covering the core layer and formed of a resin having a melting point or softening point lower than that of the resin forming the core layer.

SUMMARY OF THE INVENTION

With recent trend toward weight reduction of automobiles, the demand for a skin-covered foamed molded article that can be used as an interior material, such as seat back and deck board, is increasing. The molded articles used as these interior materials are generally formed from expanded beads and often have a relatively small thickness. The smaller the thickness of a skin-covered foamed molded article, however, the smaller the interior space within the skin in which the expanded beads have to be filled in. Thus, the demand for a smaller thickness skin-covered foamed molded article brings about a problem in filling efficiency because it becomes more difficult to fill the expanded beads in the interior space of the skin. Moreover, when expanded beads having a low apparent density are used for further weight reduction, the filling efficiency of the expanded beads can be a major problem.

Expanded beads having a smaller average diameter have a better filling efficiency than expanded beads having a larger average diameter. It is, therefore, considered preferable to use expanded beads having a smaller average diameter than that of expanded beads used commonly. However, the use of expanded beads having a small average diameter makes it difficult to stably obtain a skin-covered foamed molded article having high fusion-bonding strength both between the expanded beads and between the skin and the expanded beads. Thus, there still remains a problem to be solved in terms of industrial manufacture.

In view of the above-described circumstances, an object of the present invention is to provide a method in which polyolefin-based resin expanded beads can be filled in a hollow space of a skin, formed by blow molding, with a good efficiency and by which a skin-covered polyolefin-based resin foamed molded article having high fusion-bonding strength between expanded beads and between the skin and the expanded beads can be produced in a stable manner.

For the purpose of solving the above problem, the present inventors have conducted studies from various angles on, in particular, expanded beads that are to be filled in the hollow interior space defined by a skin. As a result, it has been found that the intended purpose can be accomplished when expanded beads having a specific average diameter and specific thermal characteristics are used. The present invention has been completed on the basis of the finding.

In accordance with one aspect of the present invention there is provided:

[1] A method for producing a skin-covered polyolefin-based resin foamed molded article, comprising the steps of:

extruding a melt comprising a polyolefin-based resin to form a parison in a softened state;

blow-molding the parison into a skin defining a hollow interior space;

filling multi-layered expanded beads comprising a polyolefin-based resin in the hollow interior space; and heating the multi-layered expanded beads filled in the hollow interior space to fuse-bond the multi-layered expanded beads to each other and to fuse-bond the multi-layered expanded beads to the skin, wherein the multi-layered expanded beads fulfill the following requirements (a) to (d)

(a) the multi-layered expanded beads have an apparent density of 0.03 to 0.2 g/cm$^3$;

(b) the multi-layered expanded beads have an average diameter of 1.5 to 3.5 mm;

(c) the multi-layered expanded beads, when measured by heat-flux differential scanning calorimetry in which a sample thereof is heated from 23° C. to 220° C. at a heating rate of 10° C./min, gives a DSC curve which has an endothermic peak A intrinsic to the polyolefin-based resin of the multi-layered expanded beads and at least one endothermic peak B on a high temperature side of the endothermic peak A, and in which a ratio of the heat of fusion of the endothermic peak B to the total heat of fusion of the endothermic peaks is 0.15:1 to 0.25:1; and (d) the multi-layered expanded beads have a surface layer having a melting point lower than that of a region inside the surface layer.

In further aspects, the present invention provides:

[2] The method for producing a skin-covered polyolefin-based resin foamed molded article according to [1], wherein each of the multi-layered expanded beads has an expanded core layer that is covered with the surface layer, wherein the expanded core layer comprises a first polyolefin-based resin having a melting point Tc and the surface layer comprises a second polyolefin-based resin having a melting point Ts, and wherein the melting points Tc and Ts satisfy the following relationship (1):

$$Tc(°C.) > Ts(°C.) \qquad (1);$$

[3] The method for producing a skin-covered polyolefin-based resin foamed molded article according to [2], wherein the melting points Tc and Ts satisfy the following relationship (2):

$$Tc(°C.) - Ts(°C.) > 3(°C.) \qquad (2);$$

[4] The method for producing a skin-covered polyolefin-based resin foamed molded article according to [2] or [3], wherein the multi-layered expanded beads are obtained by expanding multi-layer resin particles each of which has a core layer comprising the first polyolefin-based resin and an outer layer comprising the second polyolefin-based resin and wherein a weight ratio of the first polyolefin-based resin to the second polyolefin-based resin is 99.5:0.5 to 80:20;

[5] The method for producing a skin-covered polyolefin-based resin foamed molded article according to any one of [2] to [4], wherein the polyolefin-based resin of which the expanded core layer is constituted is a polypropylene-based resin having a bending elastic modulus of 500 MPa or higher;

[6] The method for producing a skin-covered polyolefin-based resin foamed molded article according to [1], wherein the polyolefin-based resin of which the multi-layered expanded beads are constituted is a polypropylene-based resin, and the endothermic peak B of the multi-layered expanded beads has a heat of fusion of 15 to 24 J/g;

[7] The method for producing a skin-covered polyolefin-based resin foamed molded article according to any one of [1] to [6], wherein the polyolefin-based resin of which the skin is constituted is a polypropylene-based resin having a melt tension at 230° C. of 1 to 30 cN; and

[8] The method for producing a skin-covered polyolefin-based resin foamed molded article according to any one of [1] to [7], wherein the skin has a thickness of 1 to 5 mm.

In the present specification, the term "skin-covered polyolefin-based resin foamed molded article" is occasionally referred to simply as "skin-covered foamed molded article" or "foamed molded article," and the term "polyolefin-based resin expanded beads" is occasionally referred to simply as "expanded beads."

In the production method of the present invention, expanded beads that fulfill the specific requirements (a) to (d) are used to produce a skin-covered foamed molded article. Owing to this feature, a skin-covered foamed molded article having high fusion-bonding strength between the expanded beads and between the skin and the expanded beads can be provided in a stable manner. In addition, the expanded beads can be filled in a hollow interior space of the skin with a good filling efficiency, even when the skin involves corner portions and portions with a small thickness. Further, the physical properties of the foamed molded article can be also improved.

Moreover, the use of expanded beads that fulfill the specific requirements (a) to (d) leads to significant reduction of the molding cycle time and improved productivity. The term "molding cycle time" as used herein refers to the period of time required to produce a skin-covered foamed molded article through a series of steps including placing a parison in a mold for blow molding, closing the mold, forming a skin defining a hollow interior space, filling expanded beads in the hollow interior space, heating the expanded beads to fuse-bond the expanded beads together, cooling the resulting foamed molded article and taking it out of the mold.

BRIEF DESCRIPTION OF DRAWINGS

Other objects, features and advantages of the present invention will become apparent from the detailed description of the preferred embodiments of the invention which follows, when considered in light of the accompanying drawings in which:

FIG. 1 shows one example of a DSC curve obtained by heat-flux differential scanning calorimetry when 1 to 5 mg of polyolefin-based resin expanded beads used in the present invention was heated from 23° C. to 220° C. at a heating rate of 10° C./min.

DESCRIPTION OF THE PREFERRED EMBODIMENTS

In one preferred embodiment of the present invention, a skin-covered foamed molded article is produced by a method including the steps of placing a parison, obtained extruding a melt containing a polyolefin-based resin, in a mold for blow molding, closing the mold, blow molding the parison into a hollow blow-molded product (skin defining a hollow interior space), filling the hollow interior space with expanded beads, supplying a heating medium, such as steam, into the hollow interior space to heat and fuse-bond the expanded beads to each other and to form a foam layer fuse-bonded to and covered with the skin, and cooling the resulting foamed molded article and taking it out of the mold. The skin-covered foamed molded article thus produced has the skin which is a hollow blow-molded product defining therein the hollow interior space. The foam layer of the expanded beads, which are fuse bonded to each other to form a foamed molded article of the expanded beads, is formed in the hollow interior space of the skin and covered with the skin. The foam layer and the skin are fuse-bonded together at their interface to form the skin-covered foamed molded article.

The expanded beads for use in the present invention must fulfill the requirement (a). Namely, the expanded beads are required to have an apparent density of 0.03 to 0.2 g/cm$^3$. When the apparent density of the expanded beads is in the above range, a good skin-covered foamed molded article can be obtained because the expanded beads are light in weight and the resulting foam layer does not shrink in the skin. The lower limit of the apparent density is preferably 0.04 g/cm$^3$. The upper limit of the apparent density is preferably 0.15 g/cm$^3$, more preferably 0.12 g/cm$^3$, much more preferably 0.1 g/cm$^3$.

The expanded beads for use in the present invention must fulfill the requirement (b). Namely, the expanded beads are required to have an average diameter of 1.5 to 3.5 mm. Expanded beads having an average diameter in the above range can be easily filled in a hollow interior space having a small thickness or a complicated shape. Thus, a good skin-covered foamed molded article can be stably obtained. In particular, even a skin-covered foamed molded article having an average thickness of less than 30 mm can be easily produced. In addition, when expanded beads having a relatively small diameter in the above range are used, the molding cycle time can be shortened even when a molded article having a large thickness is produced.

When the diameter of the expanded beads is too small, the adhesion strength of the expanded beads to the skin may be poor, although the expanded beads can be easily filled in the hollow interior space. On the other hand, when the diameter of the expanded beads is too large, the filling efficiency of the expanded beads becomes too poor to attain the object of the present invention. From the above standpoints, the expanded beads preferably have an average diameter of 1.6 to 3.2 mm, more preferably 1.7 to 3.0 mm.

When expanded beads having a relatively small diameter that fulfills the requirement (b) are molded by heating with steam, a new problem, such as insufficient fusion-bonding between the expanded beads or insufficient fusion-bonding between the expanded beads and the skin, may occur. This is a peculiar problem that occurs when expanded beads having a relatively small average diameter are used. Because expanded beads having a relatively small average diameter have a large surface area as a whole, the expanded beads respond excessively to steam heating when subjected to molding conditions. Thus, some expanded beads undergo secondary expansion at a higher rate and the expanded beads having undergone secondary expansion inhibit the flow of steam into the gaps between other expanded beads. When a skin-covered foamed molded article is produced, holes for introducing steam into the hollow interior space are formed through the skin by means of steam pins, and the expanded beads are heated by means of steam introduced into the hollow interior space through the steam pins inserted through the steam introducing holes. In other words, when a skin-covered foamed molded article is produced, the expanded beads are heated by means of steam that is introduced through a limited number of steam introducing holes compared to an expanded beads molded article produced by an ordinary in-mold molding method. Thus, when the expanded beads in the vicinity of the steam introducing holes are locally fuse-bonded earlier than others, fuse-bonded expanded beads inhibit the flow of steam to regions farther away from the steam introducing holes and prevent the steam from reaching all the expanded beads in the hollow interior space. As a result, the fusion-bonding between the expanded beads tends to be insufficient or the fusion-bonding between the expanded beads and the skin tends to be insufficient. In addition, when the expanded beads have a small diameter, the expanded beads cool easily. Thus, the thermal fusion bonding between the skin and the expanded beads takes place within a reduced period of time. As a result, the fusion-bonding strength between the skin and the expanded beads may be poor. It is, therefore, fair to say that these are peculiar problems that occur when a skin-covered foamed molded article is produced using expanded beads having a small diameter.

To solve the problems that occur when expanded beads having a relatively small diameter are used, expanded beads that additionally fulfill both the requirements (c) and (d) are used in the present invention.

The requirement (c) is that a DSC curve, that is obtained by heat-flux differential scanning calorimetry in which a sample of the expanded beads is heated from 23° C. to 220° C. at a heating rate of 10° C./min, has an endothermic peak A intrinsic to the polyolefin-based resin of which the expanded beads are constituted and at least one endothermic peak B on a high temperature side of the endothermic peak A. In addition, the ratio of the heat of fusion of the endothermic peak B to the total heat of fusion of endothermic peaks on the DSC curve (ratio of heat of fusion) must be 0.15:1 to 0.25:1. When the ratio of heat of fusion is in the above range, the rate of secondary expansion of the expanded beads can be controlled to the extent that the steam can be supplied to all the expanded beads in the hollow interior space until fusion-bonding between the expanded beads is completed. The "endothermic peak A intrinsic to the polyolefin-based resin of which the expanded beads are constituted" may be hereinafter occasionally referred to simply as "intrinsic peak," and the "at least one endothermic peak B on a high temperature side of the endothermic peak A" may be occasionally hereinafter referred to simply as "high temperature peak."

When the ratio of heat of fusion is too low, the expanded beads undergo secondary expansion at such a high rate that the expanded beads in the vicinity of the steam introducing holes locally undergo secondary expansion and fuse-bond to each other. As a result, the steam may not be supplied to all the expanded beads, resulting in insufficient fusion-bonding between the expanded beads or insufficient fusion-bonding between the expanded beads and the skin. On the other hand, when the ratio of heat of fusion is too high, the expanded beads may undergo secondary expansion so insufficiently that the fusion-bonding between the expanded beads or the fusion-bonding between the expanded beads and the skin may be insufficient. From the above standpoints, the ratio of heat of fusion is preferably 0.18:1 to 0.24:1.

When polypropylene-based resin expanded beads are used as the polyolefin-based resin expanded beads, the heat of fusion of the high temperature peak of the expanded beads, in other words, the quantity of heat (or endothermic calorific value) of the high temperature peak, on the DSC curve obtained by heat-flux differential scanning calorimetry is preferably 15 to 24 J/g. The heat of fusion of the high temperature peak has a close relationship with the fusion-bonding temperature at which the expanded beads fuse-bond to each other and the rate of secondary expansion of the expanded beads. When the heat of fusion of the high temperature peak is in the above range, the expanded beads undergo secondary expansion at a rate suitable for use in the production of a skin-covered foamed molded article.

The heat of fusion of the intrinsic peak and the heat of fusion of the high temperature peak are measured as follows by a measurement method in conformity with JIS K7122 (1987). First, 1 to 5 mg of the expanded beads is sampled. The sample is then heated from 23° C. to 220° C. at a rate of 10° C./min with a heat-flux differential scanning calorimeter to obtain a DSC curve. One example of a DSC curve obtained as a result of the above measurement (hereinafter occasionally referred to as "first heating run") is shown in FIG. 1.

The DSC curve in the first heating run shown in FIG. 1 has an intrinsic peak A derived from the polyolefin-based resin of which the expanded beads are formed and a high temperature peak B on a high temperature side of the intrinsic peak. The heat of fusion of the intrinsic peak A and the heat of fusion of the high temperature peak B correspond to respective peak areas, and can be determined in the manner specifically described below.

First, a straight line (α-β) connecting a point α on the DSC curve at 80° C. and a point β on the DSC curve at the melting completion temperature T of the expanded beads is drawn. The term "melting completion temperature T" refers to the temperature at the intersection where the DSC curve on the high temperature side of the high temperature peak B meets the base line on the high temperature side.

Next, a straight line parallel to the ordinate of the graph is drawn from a point γ at the bottom of the DSC curve between the intrinsic peak A and the high temperature peak B. This line intersects the straight line (α-β) at point σ. The area of the high temperature peak B is the area of the region bounded by the part of the DSC curve forming the high temperature peak B and the line segments (σ-β) and (γ-σ) (the hatched region in FIG. 1), and corresponds to the heat of fusion of the high temperature peak. The area of the intrinsic peak A is the area of the region bounded by the part of the DSC curve forming the intrinsic peak A and the line segments (α-σ) and (γ-σ), and corresponds to the heat of fusion of the intrinsic peak. The total heat of fusion of endothermic peaks is the sum of the heat of fusion of the intrinsic peak and the heat of fusion of the high temperature peak.

The high temperature peak B appears on the DSC curve during first heating run obtained as described above, but does not appears on DSC curve during second heating run, which is obtained when the sample is cooled to 23° C. and then heated again to 220° C. at a rate of 10° C./min after the first heating run. On the DSC curve during second heating run, only the intrinsic peak A, which is an endothermic peak intrinsic to the polyolefin-based resin of which the expanded beads are constituted, appears.

When the intrinsic peak and the high temperature peak of the expanded beads are measured using a heat-flux differential scanning calorimeter as described above, a plurality of expanded beads having a total weight of 1 to 5 mg can be directly used for the measurement when the weight per one expanded bead is less than 1 mg. When the weight per one expanded bead is 1 to 5 mg, one expanded bead can be directly used for the measurement.

The expanded beads for use in the present invention must also fulfill the requirement (d). Namely, the expanded beads are required to have a surface region having a melting point lower than that of a region inside the surface layer. When the requirement (d) is not fulfilled, the expanded beads and the skin, in particular, may not fuse-bond to each other properly even when expanded beads that fulfill the requirements (a) to (c) are used. In this case, a foamed molded article having high adhesion strength between the expanded beads and the skin may not be obtained. In the present invention, when the expanded beads fulfill the requirement (d), a skin-covered foamed molded article having high adhesion strength between the expanded beads and the skin can be obtained. In the present invention, because the rate of secondary expansion of the expanded beads must be controlled in order to prevent the expanded beads in the vicinity of the steam introducing holes from being locally fuse-bonded as described in connection with the requirement (c), the adhesion strength between the expanded beads and the skin, in particular, must be improved. Thus, the expanded beads must fulfill the requirement (d).

To fulfill the requirement (d), at least the melting point of a surface layer of the multi-layered expanded beads must be lower than the melting point of a region inside the surface layer. The term "surface layer" as used herein is intended to mean a layer that includes the outer peripheral surface of the expanded bead. As one preferred example of such multi-layered expanded beads, there may be mentioned multi-layered expanded beads each having an expanded core layer and a surface layer which covers the expanded core layer and which has a melting point lower than that of the expanded core layer. Another preferred example of such multi-layered resin expanded beads is those expanded beads having a surface that is modified so that the modified surface has a melting point lower than a region inside the modified surface. The surface modifying method disclosed in, for example, Japanese Patent Publication No. JP-A-2004-27196 and U.S. Pat. No. 6,956,067 may be suitably used for the purpose of the present invention. In the disclosed method, resin particles are dispersed in a dispersing medium and treated with an organic peroxide and then expanded using a blowing agent. In the present invention, the expanded beads each having the modified surface are regarded as multi-layered expanded beads at least because of difference in melting point in a surface region and a region inside the surface region. The polyolefin-based resin of the surface modified expanded beads is preferably a polypropylene-based resin.

When the multi-layered expanded beads have a surface layer and an expanded core layer, the fact that the melting point of the surface layer is lower than that of the expanded core layer can be identified by, for example, comparing the melting point of the resin for the surface layer and the melting point of the resin for the expanded core layer. The melting point of the surface layer and the melting point of a region inside the surface layer of the expanded beads may be directly measured. Specifically, the melting point of the surface layer may be measured by a microthermal analysis method using, for example, a system "2990 Microthermal Analyzer" manufactured by TA Instruments Japan Inc. One preferred measurement method is described in, for example, Japanese Patent Publication No. JP-A-2003-335892. The melting point of a region inside the surface layer of the multi-layered expanded beads may be determined by subjecting a sample without the surface layer, cut out of a center region of the expanded beads, to ordinary heat-flux differential scanning calorimetry.

Among various types of multi-layered expanded beads that fulfill the requirement (d), the use of multi-layered expanded beads each having an expanded core layer formed of a first polyolefin-based resin and a surface layer formed of a second polyolefin-based resin and covering the expanded core layer is preferred from the standpoint of environmental friendliness. Description will be next made in more detail of the expanded beads of this type.

In the expanded beads of this type, the first polyolefin-based resin for the expanded core layer has a melting point (Tc) and the second polyolefin-based resin for the surface layer has a melting point (Ts), and the melting points (Tc) and (Ts) satisfy the relationship (1) shown below.

$$Tc(° C.) > Ts(° C.) \quad (1)$$

More preferably, the melting point (Tc) and the melting point (Ts) satisfy the relationship (2) shown below.

$$Tc(° C.) - Ts(° C.) > 3(° C.) \quad (2)$$

The multi-layered expanded beads as described above can be obtained by, for example, expanding multi-layer resin particles having a core layer formed of the first polyolefin-based resin and an outer layer formed of the polyolefin-based resin different from the first polyolefin-based resin by a method described later. In the multi-layered expanded beads, it is preferred that the surface layer is not substantially expanded.

The melting point as used herein is a value determined by the following method. First, 1 to 5 mg of the polyolefin-based resin sampled from the expanded core layer or surface layer is heated from 23° C. to 220° C. at a heating rate of 10° C./min (first heating run), maintained at 220° C. for 10 minutes, and cooled from 220° C. to 30° C. at a cooling rate of 10° C./min, then heated again from 30° C. to 220° C. at a heating rate of 10° C./min (second heating run). The peak temperature of the endothermic peak on a DSC curve obtained during the second heating run (DSC curve in the second heating run) using a heat-flux differential scanning calorimeter is employed as the melting point of the polyolefin-based resin. When the DSC curve has a plurality of endothermic peaks, the peak temperature of the endothermic peak having the largest area is employed as the melting point. The differential scanning calorimetry is carried out according to JIS K7121 (1987).

When the polyolefin-based resin for the surface layer has no specific melting point, Vicat softening points may be used instead of the melting points to determine the resins for the core layer and surface layer of the multi-layered expanded beads. In this case, the relationship between the Vicat softening points of the resins for the core layer and the surface layer is the same as the required relationship between their melting points. The Vicat softening points are measured by the A50 method based on JIS K7206 (1999).

As described above, the expanded core layer and the surface layer are formed of different polyolefin-based resins. Such multi-layered expanded beads can be obtained by producing multi-layer resin particles from the above resins and expanding the multi-layer resin particles. The term "different resins" used herein means resins which are different in at least one of melting point, melting start temperature, heat of fusion, temperature dependence of heat of fusion, MFR, Vicat softening temperature and so on.

The composition and method for preparation of the first polyolefin-based resin are not specifically limited as long as the monomer used to obtain the first polyolefin-based resin is composed primarily of an olefin. The first polyolefin-based resin preferably contains at least 50% by weight, more preferably at least 70% by weight, still more preferably at least 90% by weight, of olefin components. Examples of the first polyolefin-based resin include polypropylene-based resin, polyethylene-based resin, polybutene-based resin and mixtures of these resins.

Examples of the polypropylene-based resins include propylene homopolymers, copolymers of propylene and a polymerizable monomer that contain 70 mol % or more, preferably 90 mol % or more, of propylene component units, and mixtures of two or more selected from these polymers. The polymers or copolymers are preferably crystalline resins.

Examples of the copolymers of propylene and another polymerizable monomer include propylene-ethylene random copolymers, propylene-ethylene block copolymers, propylene-butene random copolymers, and propylene-ethylene-butene random copolymers.

The polypropylene-based resin preferably has a melting point of 135° C. to 170° C., more preferably 145° C. to 155° C.

The polypropylene-based resin are preferably high-rigidity polypropylene-based resins having a bending elastic modulus of 500 MPa or higher, preferably 700 MPa or higher. The upper limit of the bending elastic modulus is approximately 2,000 MPa. The bending elastic modulus of the polypropylene-based resin is measured according to JIS K7171 (2008).

As the second polyolefin-based resin for the surface layer of the multi-layered expanded beads, a polyolefin-based resin similar to the first polyolefin-based resin for the expanded core layer may be used. For example, when the first polyolefin-based resin has a specific melting point as described above, a crystalline polypropylene-based resin having a melting point lower than that of the first polyolefin-based resin or a non-crystalline polypropylene-based resin having a softening point lower than the melting point of the first polyolefin-based resin is selected as the second polyolefin-based resin.

Various kinds of additives may be added as needed to the first polyolefin-based resin for the core layer of the expanded beads. Examples of the additive include an antioxidant, a UV protecting agent, an antistatic agent, a flame retardant, a metal deactivator, a pigment, a dye, a nucleating agent and a cell controlling agent. As the cell controlling agent, there may be mentioned an inorganic fine powder such as zinc borate, boric acid, talc, calcium carbonate, and calcium hydroxide. The content of the additives is suitably selected based on the types and purposes of the additives, and is generally 20 parts by weight or less, preferably 5 parts by weight or less, per 100 parts by weight of the base resin. In particular, a cell controlling agent is used in an amount of 0.005 to 1 part by weight per 100 parts by weight of the base resin in view of the cell diameter of the expanded beads. The above additives may be also added to the second polyolefin-based resin, if desired.

Description will be next made of the skin which is formed by blow molding of a parison. As the resin for the skin of the skin-covered foamed molded article, a polyolefin-based resin may be used. Preferably, a polypropylene-based resin is used. The use of a polypropylene-based resin having an MFR (melt mass-flow rate) higher than that of the resin for the foam layer formed from the expanded beads is preferred. The "MFR" is measured at a temperature of 230° C. and a load of 2.16 kg according to JIS K7210 (1999).

The polypropylene-based resin for the skin preferably has a melt tension MT (cN) at 230° C. of 1 to 30 cN, more preferably 2 to 20 cN, to avoid drawdown of the parison extruded from the die.

In the present invention, the polyolefin-based resins for the expanded beads and the polyolefin-based resin for the skin may contain, in addition to the polyolefin-based resin, other synthetic resins, synthetic rubbers, elastomers and so on as long as the intended purposes and effects of the present invention are not impaired. The content of the resins and so on other than the polyolefin-based resin is preferably 35 parts by weight or less, more preferably 20 parts by weight or less, still more preferably 10 parts by weight or less, particularly preferably 5 parts by weight or less, per 100 parts by weight of the polyolefin-based resin.

Examples of the synthetic resins other than the polyolefin-based resin include styrene-based resins such as polystyrene and styrene-maleic anhydride copolymers.

Examples of the synthetic rubbers or elastomers include synthetic rubbers, such as ethylene-propylene rubber, ethylene-1-butene rubber, propylene-1-butene rubber, styrene-butadiene rubber or its hydrogenation product, isoprene rubber, neoprene rubber and nitrile rubber; styrene-butadiene block copolymers; styrene-isoprene block copolymers; and hydrogenation products of these copolymers.

In the production method of the present invention, expanded beads that fulfill the requirements (a) to (d) are used so that a skin-covered foamed molded article having high fusion-bonding strength between the expanded beads and between the skin and the expanded beads can be stably provided. In particular, a skin-covered foamed molded article having a small thickness can be provided more stably.

Conventionally, expanded beads that fulfill the requirement (a) and therefore have a relatively high expansion ratio tend to have a large diameter and there for have a problem in terms of the filling efficiency in the hollow interior space of the skin. On the other hand, expanded beads that fulfill the requirement (b) and therefore have a small average diameter have a problem in terms of fusion-bonding strength to each other and fusion-bonding strength to the skin. The present invention solves the peculiar problems that occur when a skin-covered foamed molded article is produced using expanded beads that fulfill the requirements (a) and (b) for the first time by using expanded beads that fulfill the requirements (a) to (d), and provides a skin-covered foamed molded article having high fusion-bonding strength between the expanded beads and between the skin and the expanded beads.

In the production of a skin-covered foamed molded article, steam introducing holes are formed through the skin, and heated steam is introduced through steam pins inserted into the steam introducing holes. Then, the expanded beads filled in the hollow interior space of the skin are heated to fuse-bond the expanded beads together and to form a foam layer fuse-bonded to and covered with the skin. At this time, the positions where the steam introducing holes can be formed are limited from the standpoint of surface design of the skin-covered foamed molded article. Thus, the steam heating conditions are different from those under which an expanded beads molded article is produced by an ordinary in-mold molding method. When steam heating is conducted under such special heating conditions, i.e., by introducing steam through such limited number of steam introducing holes to heat the expanded beads, a relatively high steam pressure needs to be used so that steam can reach all the expanded beads in the hollow interior space. In this case, when expanded beads having a relatively small diameter are used, the expanded beads around the steam pins are fuse-bonded and hardened before steam reaches all the expanded beads and, therefore, inhibit the flow of steam, resulting in poor production stability or a longer molding cycle time.

In the present invention, expanded beads that fulfill, in particular, the requirement (c) are used to control the rate of secondary expansion of the expanded beads in order to prevent premature fusion bonding and hardening of expanded beads that tends to occur locally around the steam pins. On the other hand, when the rate of secondary expansion of the expanded beads is restrained as described above, the adhesion strength between the expanded beads and the skin, in particular, tends to be insufficient. This is because the expanded beads having a relatively small diameter cool easily. Thus, in order to improve the adhesion strength between the expanded beads and the skin, expanded beads that fulfill the requirement (d) are used. The rate of secondary expansion of the expanded beads, the fusion-bonding strength between the expanded beads and the adhesion strength between the expanded beads and the skin are controlled to be suitable for the production of a skin-covered foamed molded article by the interaction of the requirements (a) to (d). As a result, a skin-covered foamed molded article having high fusion-bonding strength between the expanded beads and between the skin and the expanded beads and, in particular, having a small thickness can be stably produced.

One example of the method for producing expanded beads for use in the present invention is described, taking a method for producing multi-layered polypropylene-based resin expanded beads as an example. The multi-layered expanded beads can be produced by obtaining multi-layer resin particles each having a core layer and an outer layer and then expanding the multi-layer resin particles by a method described later.

As one example of the method for producing multi-layer resin particles that are used to produce the multi-layered expanded beads, a coextrusion method is described. First, a polypropylene-based resin for the core layer and additives blended as needed are heated and kneaded in a first extruder to form a molten resin composition for the core layer. At the same time, a polypropylene-based resin for the outer layer, and additional resins and additives blended as needed are heated and kneaded in a second extruder to form a molten resin composition for the outer layer.

The molten resin compositions are supplied to a coextrusion die. In the die, the flow of the molten resin composition for the outer layer and the flow of the molten resin composition for the core layer are combined and laminated in such a way that the molten resin composition for the outer layer surrounds the molten resin composition for the core layer to form a core-sheath type composite stream. The composite stream is extruded from the die in the form of strands, and the strands are cut into a predetermined length to produce multi-layer resin particles each having a weight of 0.2 to 0.7 mg.

The thickness of the outer layer of the multi-layer resin particles can be adjusted as appropriate by adjusting the discharge rate of the molten resin composition for the core layer or the discharge rate of the molten resin composition for the outer layer, adjusting the weight ratio between the molten resin compositions, and/or adjusting the speed at which the strands extruded from the die are taken over. The multi-layer resin particles preferably have a weight ratio of the outer layer resin to the core layer resin (core layer resin:outer layer resin) of 99.5:0.5 to 80:20. In the multi-layer resin particles, the outer layer is not necessarily cover the entire surface of the core layer. The outer layer covers at least 50% or more, preferably 60% or more, much more preferably 70% or more, of the surface of each resin particle.

Then, the multi-layer resin particles are dispersed together with a blowing agent in an aqueous medium, such as water, to which a dispersing agent has been added, in a container that can be closed airtightly, such as an autoclave (hereinafter referred to as "closed vessel"). Then, the contents are heated to a temperature not lower than the softening temperature of the polypropylene-based resin forming the core layer of the multi-layer resin particles with stirring under increased pressure to impregnate the multi-layer resin particles with the blowing agent. Then, an end portion of the closed vessel, filled with the aqueous medium, is opened with the pressure in the closed vessel maintained at a level equal to or higher than the vapor pressure of the blowing agent to release the resin particles together with the aqueous medium into an atmosphere with a pressure lower than the pressure in the closed vessel in order to cause the resin particles to foam and expand. By this method (dispersion medium releasing foaming method), the multi-layered expanded beads can be obtained.

The heat of fusion of the high temperature peak of the multi-layered expanded beads for use in the present invention can be adjusted to a desired value by adjusting the temperature at which the multi-layered expanded beads are produced, the temperature and the time at and for which the resin particles are retained to impregnate the resin particles with the blowing agent, and so on.

A method for adjusting the heat of fusion of the high temperature peak is described, taking a case where the multi-layered expanded beads are produced by a dispersion medium releasing foaming method as an example. First, the multi-layer resin particles dispersed in an aqueous medium are heated to a temperature lower than the melting completion temperature of the polypropylene-based resin for the core layer, and maintained at an arbitrary temperature (Ta) which is higher than the melting point of the resin for the core layer minus 20° C. but lower than the melting completion temperature for a sufficient period of time, preferably for approximately 10 to 60 minutes. After that, the multi-layer resin particles are heated to an arbitrary temperature (Tb) which is higher than the melting point of the resin for the core layer minus 15° C. but not higher than the melting completion temperature plus 10° C., and maintained at this temperature for a sufficient period of time, preferably for approximately 10 to 60 minutes. Then, the multi-layer resin particles are released together with the aqueous medium into an environment having a pressure lower than that in the closed vessel to cause the resin particles to foam and expand.

In the above method, the temperatures Ta and Tb and the retention times are specified as described above because the heat of fusion of the high temperature peak of the multi-layered expanded beads depends mainly on the temperature Ta and the retention time at the temperature Ta, the temperature Tb and the retention time at the temperature Tb, and the heating rate.

In general, as the temperature Ta or Tb is lower within the above temperature range, or as the retention times are longer, the heat of fusion of the high temperature peak of the multi-layered expanded beads tends to increase. The method usually uses a heating rate of 0.5 to 5° C./min. Thus, production conditions suited for producing expanded beads showing a high temperature peak having a desired heat of fusion can be determined by conducting a preliminary test in consideration of these points.

The expanded beads may be used after being aged or cured under atmospheric pressure to increase the internal pressure in the expanded beads. In this case, the internal pressure in the expanded beads can be increased by filling the expanded beads in a closed vessel, introducing pressurized air into the vessel and allowing the expanded beads to stand still for a sufficient period of time for the pressurized air to permeate into the expanded beads.

In the above dispersion medium releasing expansion method, the dispersing agent added to the dispersion medium may be either organic or inorganic as long as it can prevent fuse-bonding between the multi-layer resin particles in the closed vessel. Preferably used is an inorganic substance in the form of fine powder for reasons of easiness in handling. Examples of the dispersing agent that can be used include amsnite, kaolin, talc, mica, clay, aluminum oxide, titanium oxide, basic magnesium carbonate, basic zinc carbonate, calcium carbonate and iron oxide. The dispersing agent is used in an amount of 0.001 to 5 parts by weight per 100 parts by weight of the multi-layer resin particles.

Examples of the blowing agent that can be used for the production of expanded beads include organic physical blowing agents such as aliphatic hydrocarbons, e.g. propane, butane, hexane and heptane, alicyclic hydrocarbons, e.g. cyclobutane and cyclopentane and halogenated hydrocarbons, e.g. chloromethane, trifluoromethane, 1,2-dichloroethane, 1,2,2,2-tetrafluoroethane, methyl chloride, ethyl chloride and methylene chloride; and inorganic physical blowing agents such as nitrogen, oxygen, air, carbon dioxide and water. These organic or inorganic physical blowing agents may be used singly or in combination or two or more, and an organic physical blowing agent and an inorganic physical blowing agent may be used in combination. Preferably, a blowing agent composed primarily of one or two of the inorganic physical blowing agents is used in combination with one or more of the organic physical blowing agents.

In general, the amount of blowing agent is determined appropriately based on the intended expansion ratio and the type of the blowing agent. For example, when expanded beads having an apparent density of 0.03 to 0.20 $g/cm^3$ are produced using carbon dioxide as the blowing agent, the blowing agent is usually used in an amount of 0.1 to 30 parts by weight per 100 parts by weight of the resin particles.

In this way, expanded beads for use in the present invention that fulfill the requirements (a) to (d) can be obtained.

A method for producing a skin-covered foamed molded article of the present invention using the above-mentioned multi-layered expanded beads is next outlined. First, a melt containing a polyolefin-based resin is extruded through a die from an accumulator attached to the extruder to form a parison in a softened state. The parison is suspended between a pair of dividable right and left mold halves for blow molding located immediately below the die. Then, the mold is closed to sandwich the parison between the mold halves. Air is introduced into the parison through an air introducing pipe while the parison is being sucked toward the inner surface of the mold to form a skin reflecting the shape of the mold by blow molding. At this time, the thickness of the skin can be controlled by adjusting the discharge rate of the parison from the die and a clearance of the die.

Then, at least two steam pins are inserted through the skin, and the multi-layered expanded beads are compressively filled in the hollow interior space defined by the skin from an expanded beads filling feeder while the pressure in the hollow interior space is being adjusted. After the expanded beads are filled in the hollow interior space, air is evacuated through a first half of the steam pins while heated steam is being supplied into the hollow molded article through a second half of the pins to heat the expanded beads. Next, air is evacuated through the second half of the steam pins while heated steam is being supplied into the hollow molded article through the first half of the pins. These heating operations are performed alternately for a period of time necessary to fuse-bond the expanded beads and the skin completely and to fuse-bond the expanded beads to each other. After that, the foamed molded article is cooled, and the steam pins and the expanded beads filling feeder are removed from the foamed molded article. Then, when the mold is opened, a skin-covered foamed molded article is obtained.

The compressive filling pressure, i.e., the pressure under which expanded beads are compressively filled in the hollow interior space from the expanded beads filling feeder, is 0.02 to 0.4 MPa(G).

The pressure of the heated steam supplied to heat and fuse-bond the expanded beads to form a foam layer and to fuse-bond the expanded beads to the skin is preferably 0.15 MPa to 0.6 MPa(G), more preferably 0.18 MPa to 0.5 MPa(G), although it depends on the type of the expanded beads. When the pressure of the heated steam is too low, the fusion-bonding between the expanded beads may be insufficient. As a result, prolonged heating is required to improve the fusion-bonding strength between the expanded beads.

This leads to an elongation of the molding cycle time and is therefore not preferred. On the other hand, too high a heating steam pressure is economically disadvantageous. Also, when the heated steam pressure is too high, a skin-covered foamed molded article with high dimensional accuracy may not be obtained because the resulting foam layer may shrink after molding.

In the production of the skin-covered foamed molded article of the present invention, the expanded beads may be compressively filled in the hollow interior space. The compressive filling pressure is preferably 0.05 to 0.25 MPa(G). When the compressive filling pressure is too low, the contact pressure between the expanded beads may be insufficient and a large volume may remain unfilled among the beads. Thus, the resulting foam layer tends to shrink after steam heating and the dimensional accuracy of the foam layer cannot be maintained. On the other hand, when the compressive filling pressure is too high, the air used to fill the expanded beads into the hollow interior space cannot escape because of interference of the air in the hollow interior space so that there is a possibility that regions which are not filled with the expanded beads (air pockets) may be formed or the fusion-bonding between the expanded beads may be partially insufficient.

To obtain a good foam layer that has high fusion-bonding strength between the expanded beads and hardly shrinks, it is preferred to increase the pressure in the hollow interior space to a desired molding pressure in a relatively short period of time and complete the steam heating within as short period of time as possible. On the other hand, from the standpoint of the fusion-bonding strength between the skin and the resulting foam layer, the steam heating is preferably carried out until the inner surface of the skin exhibits adhesiveness to the expanded beads. When steam heating is used, the molding time is preferably approximately 15 to 60 seconds.

The skin-covered foamed molded article obtained by the method of the present invention preferably has a skin with a thickness of 1 to 5 mm. When the skin is too thin, the resulting skin-covered foamed molded article has low rigidity and insufficient mechanical strength and may be therefore not suited for practical use. When the skin is too thick, the lightness of the skin-covered foamed molded article is diminished. In addition, because it takes a long time to cool the skin-covered foamed molded article, the productivity is impaired.

The average thickness of the skin-covered foamed molded article obtained by the method of the present invention is not specifically limited. According to the present invention, the molding cycle time can be shortened even when a skin-covered foamed molded article having a large thickness is produced. Further, even when a skin-covered foamed molded article having a small thickness is produced, the obtained skin-covered foamed molded article shows high fusion-bonding strength between the expanded beads and between the skin and the expanded beads. In particular, a good skin-covered foamed molded article having a relatively small thickness of 25 mm or less can be produced by the production method of the present invention.

The following examples and comparative examples will further illustrate the present invention. The resin used to form the skin and the raw resins used to form the core layer and outer layer of the multi-layer resin particles in each of the examples and comparative examples are shown in Table 1.

TABLE 1

| Type of resin | Abbreviation | Melting point (° C.) | MFR * (g/10 min) |
| --- | --- | --- | --- |
| Polypropylene block copolymer | PP1 | 162.5 | 0.6 |
| Polypropylene random copolymer | PP2 | 153 | 7.0 |
| Polypropylene random copolymer | PP3 | 151 | 7.0 |
| Polypropylene random copolymer | PP4 | 143 | 6.0 |
| Metallocene-based polypropylene random copolymer | PP5 | 125 | 2.0 |

* Measured at 230° C. and load of 2.16 kg

Production of Resin Particles:

An extrusion device having an extruder (inside diameter: 65 mm) for forming a core layer, an extruder (inside diameter: 30 mm) for forming an outer layer and a die for forming multi-layered strands which was attached to the exits of the two extruders was used. The polyolefin-based resins for the core layer and outer layer shown in Table 2 or 3 were melted and kneaded in respective extruders to obtain molten kneaded masses. The molten kneaded masses were introduced into the die for forming multi-layered strands, combined in the die and then extruded in the form of strands through small holes of a mouthpiece attached to a die exit. Each strand had a two-layer structure consisting of a core layer and an outer layer (core-sheath form) (weight ratio of the core layer to the outer layer was 95:5). In Comparative Examples 5 and 7, only the resin for the core layer was used and the resulting molten kneaded mass was extruded as single-layer strands. The extruded strands were cooled with water and then cut with a pelletizer into pieces necessary to obtain expanded beads having an average diameter shown in Table 2 or 3 Drying of the cut pieces gave multi-layer resin particles. The resins used for forming the multi-layer resin particles and the physical properties of the resin particles are summarized in Tables 2 and 3.

The polyolefin-based resin for the core layer was fed in the form of a master batch prepared to contain 1,000 ppm by weight of zinc borate as a cell controlling agent.

Production of Expanded Beads:

The obtained multi-layer resin particles (800 g) were charged in a 5 L closed vessel together with 3 L of water as a dispersing medium, to which 0.3 parts by weight of kaolin as a dispersing agent, 0.4 parts by weight (as an active component) of a surfactant (sodium alkylbenzenesulfonate, Trade name: Neogen, manufactured by Dai-ichi Kogyou Seiyaku Co., Ltd.) and 0.01 parts of aluminum sulfate per 100 parts by weight of the multi-layer resin particles were added. Carbon dioxide as a blowing agent was then injected into the closed vessel in an amount necessary to obtain expanded beads having an apparent density shown in Table 2 or 3. The contents were heated with stirring to a temperature 5° C. lower than the foaming temperature shown in Table 2 or 3 and then maintained at that temperature for 15 minutes to adjust the heat of fusion of the high temperature peak. After having been heated to the foaming temperature shown in Table 2 or 3 and maintained at that temperature for another 15 minutes, the contents were released to atmospheric pressure together with the water to obtain multi-layered expanded beads having an apparent density shown in Table 2 or 3. The physical properties, etc. of the obtained multi-layered expanded beads are summarized in Tables 2 and 3.

Production of Skin-Covered Foamed Molded Article:

EXAMPLE 1

A polypropylene-based resin (PP1) (manufactured by Prime Polymer Co., Ltd., trade name: Prime Polypro, grade: E-150GK, melt flow rate (MFR): 0.6 g/10 min (230° C., load: 2.16 kg), melt tension (MT): 7.0 cN, melting point:

162.5° C.) was heated to 210° C. and kneaded in an extruder having an inside diameter of 65 mm to prepare a melt of the resin (PP1).

The melt was then filled in an accumulator attached to the extruder and adjusted to 210° C. The melt was then extruded through a die, and the resulting parison in a softened state was placed between mold halves of a dividable flat plate-like mold located immediately below the die and having a length of 730 mm, a width of 420 mm and a thickness of 20 mm. The mold was closed and adjusted to 70° C. Then, pressurized air with a pressure of 0.50 MPa(G) was blown into the parison from a blow gas introducing hole and, at the same time, the space between the outer surface of the parison and the inner surface of the mold was depressurized to form a hollow blow-molded product (skin defining a hollow interior space) conforming to the shape of the mold cavity and having a thickness of 1.5 mm. The mold used was provided with an expanded beads filling feeder (diameter: 15 mmϕ) and insertion holes (each of the mold halves had four holes) for steam pins (diameter: 8 mmϕ).

Then, the steam pins were inserted through the skin in a softened state from the steam pin insertion holes of the mold halves. Expanded beads were then filled in the hollow interior space of the skin while the gas in the interior space was being evacuated through slits formed in the peripheral walls of the steam pins to adjust the pressure inside the skin. As the expanded beads, multi-layered propylene-based resin expanded beads as shown in Table 2 were used. The expanded beads were filled in the hollow interior space of the skin from the expanded beads filling feeder through an expanded beads filling hole additionally formed through the skin.

After the filling of the expanded beads had been completed, heated steam with a pressure shown in the Table 2 was supplied into the skin for 8 seconds through four of the eight steam pins inserted through the skin while steam was being sucked out of the skin through the other four steam pins. Then, steam with a pressure of 0.42 MPa(G) was supplied into the skin through the steam pins, through which steam had been sucked out, for 8 seconds while steam was being sucked out through the steam pins through which steam had been supplied. Finally, steam with a pressure of 0.42 MPa(G) was supplied through all the steam pins for 6 seconds to heat and fuse-bond the expanded beads together and to fuse-bond the expanded beads to the inner surface of the skin. After the molding, the mold was cooled and the steam pins were removed. When the mold was opened, an intended skin-covered foamed molded article was obtained. The physical properties of the obtained foamed molded article are summarized in Table 2.

EXAMPLE 2

The same procedure as in Example 1 was repeated except that the expanded beads as shown in Table 2 were used and the molding was carried out under the molding conditions shown in Table 2. The physical properties of the obtained foamed molded article are summarized in Table 2. Because the expanded beads used in this example have a higher ratio of heat of fusion than that of the expanded beads of Example 1, the molding was carried out at a higher steam pressure than that used in Example 1.

EXAMPLE 3

The same procedure as in Example 1 was repeated except that the expanded beads as shown in Table 2 were used and the molding was carried out under the molding conditions shown in Table 2. The physical properties of the obtained foamed molded article are summarized in Table 2. Because the expanded beads used in this example had a lower ratio of heat of fusion than that of the expanded beads of Example 1, secondary expansion tended to occur more easily, the steam flow became less smooth and the molding cycle time became longer as compared with Example 1.

EXAMPLE 4

The same procedure as in Example 1 was repeated except that the expanded beads as shown in Table 2 were used and the molding was carried out under the molding conditions shown in Table 2. The physical properties of the obtained foamed molded article are summarized in Table 2. Because the resin for the expanded core layer used in this example had a higher melting point than that of the Example 1, the molding was carried out using a higher steam pressure.

EXAMPLE 5

The same procedure as in Example 1 was repeated except that expanded beads having an average diameter shown in Table 2 were used. Because the expanded beads used in this example had a smaller average diameter than that of the expanded beads of Example 1, the contact pressure on the inner surface of the mold decreased quickly and the molding cycle time was therefore shortened.

COMPARATIVE EXAMPLE 1

The same procedure as in Example 1 was repeated except that expanded beads having an average diameter shown in Table 3 were used. The physical properties of the obtained foamed molded article are summarized in Table 3. The expanded beads used in this example had a large diameter and were not able to be filled in the hollow interior space properly and completely. As a result, a good skin-covered foamed molded article was not obtained.

COMPARATIVE EXAMPLE 2

The same procedure as in Example 1 was repeated except that expanded beads having an average diameter shown in Table 3 were used. The physical properties of the obtained foamed molded article are summarized in Table 3. Because the expanded beads used in this example had an excessively small diameter and therefore underwent secondary expansion excessively, the steam did not reach all the expanded beads. Thus, the fusion-bonding between the expanded beads was insufficient. In addition, because the contact pressure on the inner surface of the mold decreased too quickly to provide sufficient time for the expanded beads to fuse-bond to the skin, the adhesion strength between the skin and the expanded beads was insufficient.

COMPARATIVE EXAMPLE 3

The same procedure as in Example 1 was repeated except that expanded beads shown in Table 3 were used and the molding was carried out under the molding conditions shown in Table 3. The physical properties of the obtained foamed molded article are summarized in Table 3. The expanded beads used in this example had an excessively high ratio of heat of fusion and did not fuse-bond to each other and to the skin properly even through the steam pressure was increased.

COMPARATIVE EXAMPLE 4

The same procedure as in Example 1 was repeated except that expanded beads shown in Table 3 were used and the molding was carried out under the molding conditions shown in Table 3. The physical properties of the obtained foamed molded article are summarized in Table 3. The expanded beads used in this example had excessively low a ratio of heat of fusion and underwent secondary expansion too quickly. Thus, steam did not reach all the expanded beads. As a result, the fusion-bonding both between the expanded beads and between the expanded beads and the skin was insufficient.

COMPARATIVE EXAMPLE 5

The same procedure as in Example 1 was repeated except that single-layer propylene-ethylene random copolymer expanded beads (ethylene content: 1.4% by weight, apparent density: 0.048 g/cm$^3$, average diameter: 2.7 mm) were used as the expanded beads and the molding was carried out under the molding conditions shown in Table 3. The physical properties of the obtained foamed molded article are summarized in Table 3. Because the expanded beads had a single-layer structure, the adhesion strength between the expanded beads and the skin was insufficient even through the steam pressure was increased.

EXAMPLE 6

A molded article having a relatively large thickness was produced using a dividable flat plate-like mold having a length of 730 mm, a width of 420 mm and a thickness of 50 mm. The same procedure as in Example 1 was repeated except that expanded beads having an average diameter shown in Table 2 were used. The physical properties of the obtained foamed molded article are summarized in Table 2. The comparison of the result of this example with the results of Comparative Examples 6 and 7 shows that the molding cycle time can be shortened when the expanded beads of the present invention are used.

COMPARATIVE EXAMPLE 6

The same procedure as in Example 1 was repeated except that the same dividable flat plate-like mold as used in Example 6 was used and expanded beads having an average diameter shown in Table 3 were used. The physical properties of the obtained foamed molded article are summarized in Table 3. The molding cycle time was too long to achieve high productivity.

COMPARATIVE EXAMPLE 7

The same procedure as in Example 1 was repeated except that the same dividable mold as used in Comparative Example 6 was used and single-layer expanded beads formed only of the same copolymer as used to form the expanded core layer of Example 6 and having a diameter of 3.7 mm were used. The physical properties of the obtained foamed molded article are summarized in Table 3. It took a long time to produce a foamed molded article because a molding cycle time longer than that required in Comparative Example 6 was required.

TABLE 2

| | | Example | | 1 | 2 | 3 | 4 | 5 | 6 |
|---|---|---|---|---|---|---|---|---|---|
| Resin particles | Core layer | Raw resin | — | PP3 | PP3 | PP4 | PP2 | PP3 | PP3 |
| | | Melting point | °C. | 151 | 151 | 143 | 153 | 151 | 151 |
| | Outer layer | Raw resin | — | PP5 | PP5 | PP5 | PP5 | PP5 | PP5 |
| | | Melting point | °C. | 125 | 125 | 125 | 125 | 125 | 125 |
| | Difference in melting point | | °C. | 26 | 26 | 18 | 28 | 26 | 26 |
| Expanded beads | Foaming conditions | Blowing agent | — | $CO_2$ | $CO_2$ | $CO_2$ | $CO_2$ | $CO_2$ | $CO_2$ |
| | | Foaming temperature | °C. | 156.5 | 156.0 | 146.5 | 157.5 | 156.5 | 156.5 |
| | Physical properties | Layer structure | — | Multi | Multi | Multi | Multi | Multi | Multi |
| | | Average diameter | mm | 2.7 | 2.7 | 2.7 | 2.7 | 2.0 | 2.7 |
| | | Apparent density | g/cm$^3$ | 0.048 | 0.048 | 0.048 | 0.048 | 0.048 | 0.048 |
| | | Melting point | °C. | 151 | 151 | 143 | 153 | 151 | 151 |
| | | Heat of fusion of high temperature peak | J/g | 20 | 22 | 17 | 19 | 20 | 20 |
| | | Ratio of heat of fusion (high-temperature side/total) | — | 0.22 | 0.24 | 0.2 | 0.2 | 0.22 | 0.22 |
| Skin-covered foamed molded article | Production conditions | Skin resin | — | PP1 | PP1 | PP1 | PP1 | PP1 | PP1 |
| | | Compressive filling pressure | MPa | 0.15 | 0.15 | 0.1 | 0.2 | 0.15 | 0.15 |
| | | Heating steam pressure | MPa | 0.42 | 0.44 | 0.36 | 0.45 | 0.42 | 0.42 |
| | | Molding cycle time | Sec | 210 | 210 | 240 | 215 | 190 | 210 |
| | Physical properties | Density of foam layer | g/cm$^3$ | 0.04 | 0.04 | 0.042 | 0.039 | 0.042 | 0.04 |
| | | Skin thickness | mm | 1.5 | 1.5 | 1.5 | 1.5 | 1.5 | 1.5 |
| | | Filling efficiency | | Good | Good | Good | Good | Good | Good |
| | | Fusion-bonding strength between expanded beads | | Good | Good | Good | Good | Good | Good |
| | | Adhesion strength between expanded beads and skin | | Good | Good | Good | Good | Good | Good |

TABLE 3

| Comparative Example | | | 1 | 2 | 3 | 4 | 5 | 6 | 7 |
|---|---|---|---|---|---|---|---|---|---|
| Resin particles | Core layer | Raw resin | — | PP3 | PP3 | PP3 | PP3 | PP3 | PP3 | PP3 |
| | | Melting point °C. | 151 | 151 | 151 | 151 | 151 | 151 | 151 |
| | Outer layer | Raw resin | — | PP5 | PP5 | PP5 | PP5 | — | PP5 | — |
| | | Melting point °C. | 125 | 125 | 125 | 125 | — | 125 | — |
| | Difference in melting point | °C. | 26 | 26 | 26 | 26 | — | 26 | — |
| Expanded beads | Foaming conditions | Blowing agent | — | $CO_2$ | $CO_2$ | $CO_2$ | $CO_2$ | $CO_2$ | $CO_2$ | $CO_2$ |
| | | Foaming temperature °C. | 156.5 | 156.5 | 155.0 | 157.5 | 156.5 | 156.5 | 156.5 |
| | Physical properties | Layer structure | — | Multi | Multi | Multi | Multi | Single | Multi | Single |
| | | Average diameter mm | 3.7 | 1.2 | 2.7 | 2.7 | 2.7 | 3.7 | 3.7 |
| | | Apparent density g/cm³ | 0.048 | 0.048 | 0.052 | 0.048 | 0.048 | 0.048 | 0.048 |
| | | Melting point °C. | 151 | 151 | 151 | 151 | 151 | 151 | 151 |
| | | Heat of fusion of high temperature peak J/g | 20 | 20 | 25 | 13 | 20 | 20 | 20 |
| | | Ratio of heat of fusion (high-temperature side/total) | 0.22 | 0.22 | 0.27 | 0.14 | 0.22 | 0.22 | 0.22 |
| Skin-covered foamed molded article | Production conditions | Skin resin | — | PP1 | PP1 | PP1 | PP1 | PP1 | PP1 | PP1 |
| | | Compressive filling pressure MPa | 0.15 | 0.12 | 0.15 | 0.15 | 0.15 | 0.15 | 0.15 |
| | | Heating steam pressure MPa | 0.42 | 0.42 | 0.46 | 0.36 | 0.48 | 0.42 | 0.48 |
| | | Molding cycle time Sec | — | 210 | 210 | 240 | 230 | 255 | 280 |
| | Physical properties | Density of foam layer g/cm³ | — | 0.04 | 0.039 | 0.038 | 0.04 | 0.04 | 0.04 |
| | | Skin thickness mm | 1.5 | 1.5 | 1.5 | 1.5 | 1.5 | 1.5 | 1.5 |
| | | Filling efficiency | Bad | Good | Good | Good | Good | Good | Good |
| | | Fusion-bonding strength between expanded beads | Bad | Fair | Bad | Bad | Bad | Good | Fair |
| | | Adhesion strength between expanded beads and skin | Bad | Bad | Bad | Bad | Bad | Good | Good |

The results shown in Tables 2 and 3 indicate the following.

(1) When the expanded beads have an average diameter greater than the range defined in claim 1, the expanded beads cannot be filled in the hollow interior space properly, and the fusion-bonding strength between the expanded beads and the fusion bonding between the expanded beads and the skin tend to be inferior. On the other hand, when the expanded beads have an average diameter smaller than the range defined in claim 1, the fusion-bonding between the expanded beads tends to be partially insufficient and the fusion-bonding strength between the expanded beads and the skin will be inferior, although the expanded beads can be filled in the hollow molded article properly.

(2) When the ratio of the heat of fusion of the high temperature peak to the total heat of fusion of endothermic peaks of expanded beads is lower than the range defined in claim 1, the foamed molded article has low fusion-bonding strength between the expanded beads and between the expanded beads and the skin will be inferior unless the molding cycle time is elongated. When the ratio of heat of fusion is higher than the range defined in claim 1, both the fusion-bonding strength between the expanded beads and the fusion-bonding strength between the expanded beads and the skin will be inferior.

The test methods employed in the Examples and Comparative Examples are as follows.

Method for Measuring Melt Tension

The melt tension (cN) was measured using a Capirograph 1D manufactured by Toyo Seiki Seisaku-sho, Ltd. Specifically, a cylinder having a diameter of 9.55 mm and a length of 350 mm and an orifice having a nozzle diameter of 2.095 mm and a length of 8.0 mm were used. The cylinder and the orifice were adjusted to 230° C., and a necessary amount of a polypropylene-based resin sample was put into the cylinder. After the sample was allowed to stand for 4 minutes, the molten resin was extruded in the form of a string through the orifice at a piston speed of 10 mm/min. The string was wound around a pulley for detecting tension having a diameter of 45 mm. The string was then taken up onto a take-up roller while the take-up speed was being increased at a constant rate from 0 mm/min to 200 mm/min through a period of 4 minutes, and the maximum value of the tension immediately before the string was broken was measured. The reason why the take-up speed increased from 0 mm/min to 200 mm/min through a period of 4 minutes is to prevent thermal degradation of the resin and to improve the reproducibility of the obtained value. The above procedure was performed 10 times on different samples. The largest three and the smallest three maximum values were excluded and the arithmetic average of the rest four maximum values was employed as the melt tension (cN).

Apparent Density of Expanded Beads

The apparent density of the expanded beads can be obtained by preparing a measuring cylinder containing an alcohol (such as ethanol) at 23° C., immersing approximately 500 ml of expanded beads (weight: W(g)), which have been allowed to stand under the conditions of a relative humidity of 50%, 23° C. and 1 atm for two days, in the alcohol in the measuring cylinder using a metal mesh or the like, obtaining the volume V (cm³) of the expanded beads from the rise of the alcohol level, and dividing the weight of the expanded beads by the volume of the expanded beads (W/V).

Density of Foam Layer

The density of the foam layer can be obtained by dividing the weight (g) of the layer by the volume (cm³) of the layer determined from its external dimensions.

Skin Thickness

The skin thickness of the skin-covered foamed molded article is determined as follows. The obtained skin-covered foamed molded article is sliced perpendicular to its thickness at three locations, and the thickness of the skin is measured at six points spaced regularly along the circumference of each cross-section (except portions having a special shape). The arithmetic mean of the thicknesses at the eighteen points is defined as the skin thickness.

Average Diameter of Expanded Beads

The maximum diameters of one hundred arbitrarily-selected expanded beads are measured and the average of the measured values is defined as the average diameter of the expanded beads.

Molding Cycle Time

The amount of time required to perform a series of steps including placing the parison to be formed into a skin between mold halves, closing the mold, filling the expanded beads into the skin, heating the expanded beads to fuse-bond the expanded beads to each other and to the skin, cooling the foamed molded article and releasing the foamed molded article from the mold is defined as the molding cycle time (seconds).

Evaluation of Filling Efficiency

Good: The expanded beads were able to be filled in the skin without any filling failure.

Bad: The expanded beads were not able to be filled properly because the filling feeder pipe was clogged with the expanded beads.

Fusion-Bonding Strength Between Expanded Beads

Five test pieces for evaluation of fusion-bonding strength that did not include the skin and had a size of 100 mm×100 mm×(thickness of the foam layer of the skin-covered foamed molded article) were cut out of five portions of the skin-covered foamed molded article except the center of its plate-like portion and the four corners (rounded portions). Each of the test pieces was broken into two halves, and 100 or more expanded beads in the broken surface were visually observed to count the number of broken expanded beads and the number of expanded beads separated along their interface. The percentage of the number of the broken expanded beads to the sum of the number of broken expanded beads and the number of expanded beads separated along their interface was obtained for each the five test piece. The smallest percentage value among the percentage values of the five test pieces was defined as fusion-bonding rate of the expanded beads. The fusion-bonding strength was evaluated on the basis of the fusion-bonding rate according to the following criteria.

Good: The fusion-bonding rate is 50% or higher.

Fair: The fusion-bonding rate is equal to or higher than 30% but lower than 50%.

Bad: The fusion-bonding rate is lower than 30%.

(Adhesion Strength Between Skin and Expanded Beads)

Five test pieces having the skin and having a size of 100 mm×100 were cut out of the center of the plate-like portion and four corner portions (except the rounded portions) of the obtained skin-covered foamed molded article as test pieces for evaluation of the adhesion strength between the skin and the expanded beads. The skin of each test piece was peeled off and 100 or more expanded beads in the peeled surface were visually observed to count the number of broken expanded beads and the number of expanded beads separated along an interface between the expanded beads and the skin. The percentage of the number of the broken expanded beads to the sum of the number of broken expanded beads and the number of expanded beads separated along an interface between the expanded beads and the skin was obtained for each test peace. The smallest percentage value among the percentage values of the five test pieces was defined as the adhesion rate between the skin and the expanded beads. The adhesion strength was evaluated on the basis of the adhesion rate according to the following criteria.

Good: The adhesion rate is 50% or higher.

Bad: The adhesion rate is lower than 50%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2013-142707, filed Jul. 8, 2013, inclusive of the specification, claims and drawings, are hereby incorporated by reference herein.

What is claimed is:

1. A method for producing a skin-covered polyolefin-based resin foamed molded article, comprising the steps of:
   extruding a melt comprising a polyolefin-based resin to form a parison in a softened state;
   blow-molding the parison into a skin defining a hollow interior space;
   filling multi-layered expanded beads comprising a polyolefin-based resin in the hollow interior space;
   forming holes for introducing steam into the hollow interior space through steam pins by inserting steam pins through the skin; and
   heating the multi-layered expanded beads filled in the hollow interior space to fuse-bond the multi-layered expanded beads to each other and to fuse-bond the multi-layered expanded beads to the skin by introducing steam into the hollow interior space through the steam pins inserted through the holes,
   wherein the multi-layered expanded beads fulfill the following requirements (a) to (e):
   (a) the multi-layered expanded beads have an apparent density of 0.03 to 0.2 g/cm$^3$;
   (b) the multi-layered expanded beads have an average diameter of 1.5 to 3.0 mm and are formed by expanding multi-layer resin particles each having a weight of 0.2 to 0.7 mg;
   (c) the multi-layered expanded beads, when measured by heat-flux differential scanning calorimetry in which a sample thereof is heated from 23° C. to 220° C. at a heating rate of 10° C/min, gives a DSC curve which has an endothermic peak A intrinsic to the polyolefin-based resin of the multi-layered expanded beads and at least one endothermic peak B on a high temperature side of the endothermic peak A, and in which a ratio of the heat of fusion of the endothermic peak B to the total heat of fusion of the endothermic peaks is 0.15:1 to 0.25:1 and the endothermic peak B of the multi-layered expanded beads has a heat of fusion of 15 to 24 J/g;
   (d) the multi-layered expanded beads have a surface layer having a melting point lower than that of a region inside the surface layer; and
   (e) the polyolefin-based resin of which the multi-layered expanded beads are comprised is a polypropylene-based resin.

2. The method for producing a skin-covered polyolefin-based resin foamed molded article according to claim 1,
   wherein each of the multi-layered expanded beads has an expanded core layer that is covered with the surface layer,
   wherein the expanded core layer comprises a first polyolefin-based resin having a melting point Tc and the surface layer comprises a second polyolefin-based resin having a melting point Ts, and wherein the melting points Tc and Ts satisfy the following relationship (1):

$$Tc\ (°C.) > Ts\ (°C.) \qquad (1).$$

3. The method for producing a skin-covered polyolefin-based resin foamed molded article according to claim 2, wherein the melting points Tc and Ts satisfy the following relationship (2):

$$Tc\ (°C.) - Ts\ (°C.) > 3\ (°C.) \qquad (2).$$

4. The method for producing a skin-covered polyolefin-based resin foamed molded article according to claim 2, wherein the multi-layered expanded beads are obtained by expanding multi-layer resin particles each of which has a core layer comprising the first polyolefin-based resin and an outer layer comprising the second polyolefin-based resin and wherein a weight ratio of the first polyolefin-based resin to the second polyolefin-based resin is 99.5:0.5 to 80:20.

5. The method for producing a skin-covered polyolefin-based resin foamed molded article according to claim 2, wherein the polyolefin-based resin of which the expanded core layer is constituted is a polypropylene-based resin having a bending elastic modulus of 700 MPa or higher.

6. The method for producing a skin-covered polyolefin-based resin foamed molded article according to claim 1, wherein the polyolefin-based resin of which the skin is constituted is a polypropylene-based resin having a melt tension at 230° C. of 1 to 30 cN.

7. The method for producing a skin-covered polyolefin-based resin foamed molded article according to claim 1, wherein the skin has a thickness of 1 to 5 mm.

\* \* \* \* \*